Feb. 20, 1973  G. RENAUD  3,716,897
TIGHTENING COLLAR
Filed Feb. 14, 1972
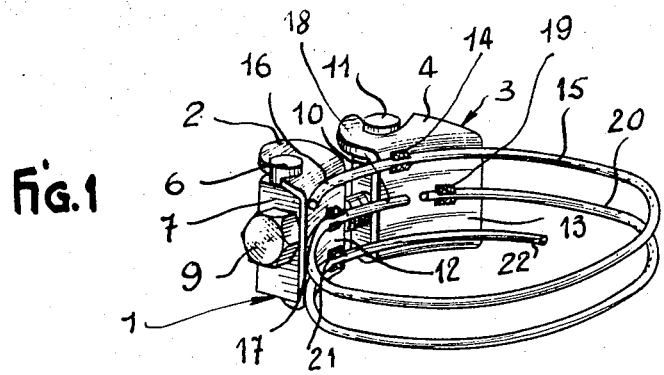
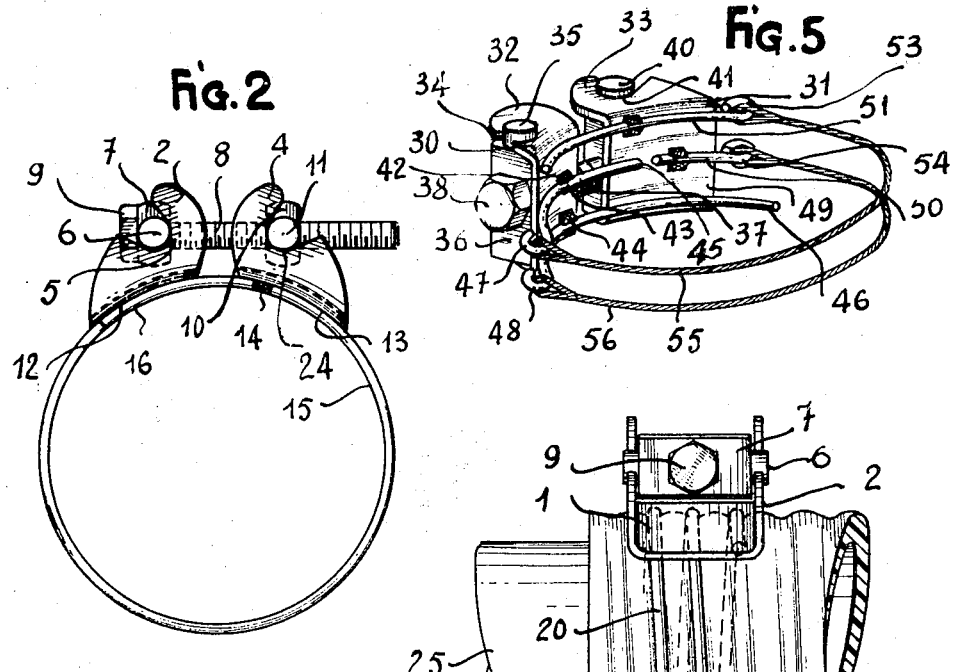
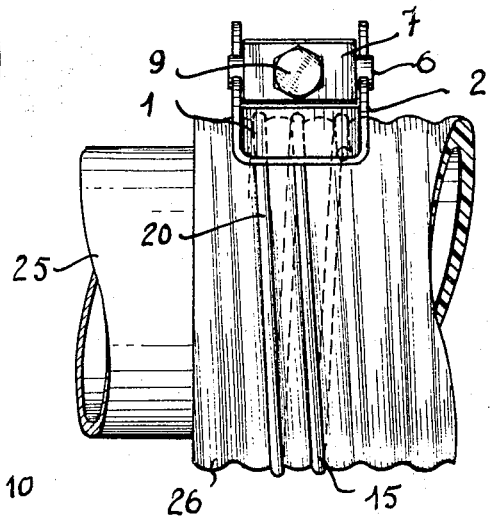
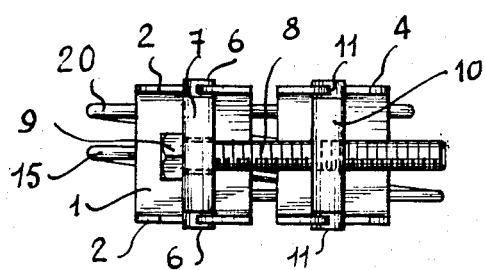

United States Patent Office 3,716,897
Patented Feb. 20, 1973

3,716,897
TIGHTENING COLLAR
Georges Renaud, Nogent-sur-Marne, France, assignor to Louis Claude Weydert, Rueil-Malmaison, France
Filed Feb. 14, 1972, Ser. No. 226,081
Claims priority, application France, Feb. 16, 1971, 2,105,129
Int. Cl. B65d 63/02
U.S. Cl. 24—283                                    7 Claims

ABSTRACT OF THE DISCLOSURE

A clamping device particularly suited for use with tubes having a helical reinforcement member embedded therein. The device is characterized by a pair of tube engaging wires or wire-cable combinations each of which encompasses in excess of one turn of a helix, these tube engaging elements cooperating to form a substantially continuous means for engaging a tube along a length exceeding two full turns of the reinforcement member.

BACKGROUND OF THE INVENTION

(1) Field of the invention

The present invention relates to the joining of conduits. More specifically, this invention is directed to a tightening collar designed for use with reinforced tubes and particularly those tubes which include a helicoidal reinforcement member in the form of a metal or plastic wire bent helically and inserted or molded in the wall of the tube. Accordingly, the general objects of the present invention are to provide novel and improved methods and articles of such character.

(2) Description of the prior art

Tubuar conduits which are characterized by helicoidal reinforcement of the tube wall are widely used and offer the advantage, in comparison to conduits of other configuration, of being much stronger particularly from the standpoint of withstanding greater internal pressures. In order to affix a conventional straight walled tube to a mouthpiece or other conduit having an outer diameter commensurate with the tube inner diameter, it is conventional practice to provide a tightening collar about the end of the tube. Such prior art tightening collars comprise a pair of clamping members, one of such members being integral with one end of a fastening element, which may be a wire or metal band, and the other clamping member being affixed the opposite end of the fastening element. Means are provided to move the clamping members toward one another and circumferentially with respect to the conduits to be joined whereby the fastening element will grip and compress the end of the tube against the mouthpiece.

There are numerous varieties of tightening collars of the type briefly described above which function faultlessly when employed on straight walled tubes. However, these prior art tightening collars have proved ineffective as a means for securing tubes having helicoidal reinforcement members to a conduit. This ineffectiveness has resulted from the fact that the prior art tightening collars inevitably straddle one turn of the helicoidal reinforcement member of the tube whereby the pressure exerted on the tube by the collar is not uniform. This lack of uniformity in application of pressure has resulted in the more flexible portions of the tube; i.e. the portions situated between the turns of the reinforcement member; undergoing deformation while the reinforced portions of the tube remain undeformed. This relative distortion of the tube portions has resulted in leakage between the tube and the conduit to which it is being joined.

In the interest of eliminating the above described deficiency of conventional prior art tightening collars when applied to helicoidally reinforced tubes, it has been suggested that tightening collars should be made wherein the ends of the fastening element interconnecting the clamping pieces are offset in such a manner that the fastening element is inserted between two turns of the tube reinforcement member. Such collars have not however proved satisfactory because the tube is not held tightly against the mouthpiece or conduit on a level with the means for bringing the clamping pieces together and, accordingly, the desired hermeticity has not been obtained.

A further tightening collar, comprising two clamping pieces fitted with means for bringing such pieces together and wherein one of the clamping pieces was integral with one of the ends of a fastening element and the other with the opposite end thereof, the fastening element being bent helically in such a way as to form two turns, has been proposed. This further proposed tightening collar, however, possesses the same deficiencies of those previously discussed in that it does not provide the desired sealing effect. In the case of tightening collars employing the two turn helical fastening element between the clamping pieces it has been found that, as the clamping pieces are brought together during tightening, the tractive stress is exerted solely on the two ends of the fastening element. This effect, in turn, results in firm application of the portions of the fastening element adjacent the ends thereof to the tube while those portions of the fastening element which are at a distance from the ends thereof are applied against the tube lightly. This detrimental effect is particularly noticeable in the case of tubes of substantial diameter and comprised of a relatively hard material; the fastening element of the tightening collar having to be firm and made of a strong metal band in such cases. It may also be noted that tightening collars employing a multi-turn helically formed fastening element are also difficult to install due to the fact that the central part of the fastening element is not connected to the clamping pieces.

SUMMARY OF THE INVENTION

The present invention overcomes the above briefly discussed and other disadvantages and deficiencies of the prior art by providing a novel and improved tightening collar for use with tubes and conduits which include an integral helicoidal reinforcement member. In accordance with the invention a tightening collar is provided which comprises two fastening elements bent helically to form turns corresponding to those of the reinforcement member of the tube. Tightening collars in accordance with the invention also comprise a pair of clamping pieces and means for translating such clamping pieces circumferentially of the tube and toward one another during a tightening procedure. One of the ends of each of the fastening elements is affixed to each clamping piece while the other end of each fastening element is affixed to the opposite clamping piece. Tightening collars in accordance with the invention are further characterized by the first clamping piece being integral with a bar which forms a prolongation of one of the ends of the first fastening element, the prolongation extending at least as far as the second clamping piece and contacting the inwardly disposed face thereof. Also, the second clamping piece is integral with two bars; one of such bars forming a prolongation of the second fastening element in the direction of the free end of the first fastening element, and the other bar forming a prolongation of the opposite end of the second fastening element. The length of these two bars is such that they extend to and contact the inwardly disposed face of the first clamping piece.

The above described construction results in the tightening collar which grips a helicoidally reinforced tube over a distance exceeding two turns of the tube reinforcement member without any substantial break in continuity whereby the desired degree of hermeticity is provided between inner surfaces of the reinforced tube and a mouthpiece or other conduit to which it is to be joined.

A further characteristic of the present invention resides in the fact that the inwardly disposed faces of the clamping pieces; i.e., those surfaces which are turned toward the reinforced tubular member; are concave. Accordingly, as the collar is tightened the concave faces of the clamping pieces form "ramps" for the bars and force the bars tightly against the tube.

In accordance with a first embodiment of the invention, the first fastening element and the bar which forms a prolongation of one end thereof are integral and formed from a single wire; this wire being bent helically. Also, the second fastening element and the corresponding bars are also formed by a single helically formed wire.

In accordance with a further embodiment of the invention, each of the aforementioned bars is provided with a loop at its free end; i.e., at the end opposite to that which is directed toward the clamping piece with which it is not integral. The fastening element portions which provide connection between the bars are, in the case of this second embodiment, comprised of cables having free ends fitted with rings which engage the said loops. This construction permits a tightening collar which may be used for tubes of widely varying diameters by merely changing the cables.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which:

FIG. 1 is a perspective view of the first embodiment of a tightening collar in accordance with the present invention;

FIG. 2 is a front elevation view of the tightening collar of FIG. 1;

FIG. 3 is a top plan view of the tightening collar of FIGS. 1 and 2;

FIG. 4 is an illustration of the embodiment of FIG. 1 employed to join a reinforced tube to a smooth walled conduit; and FIG. 5 is a perspective view of a second embodiment of the invention.

DESCRIPTION OF THE PREFERRED EMBODIMENTS

With reference simultaneously to FIGS. 1-3, a tightening collar in accordance with the present invention comprises a first clamping piece 1, of generally U-shape, having a pair of opposed cheeks 2. The tightening collar also comprises a second generally U-shaped clamping piece 3 having a pair of opposed cheeks 4. Cheeks 2 of clamping piece 1 are provided with slots 5 which are pivotally engaged by the cylindrical extensions 6 of an elongated member 7. Member 7 is provided with a smooth bore hole and a screw 8 passes through said hole 7. The head 9 of screw 8 contacts and interacts with the flat, outwardly disposed face of member 7. The cheeks 4 of clamping piece 3 are provided with notches 24 which pivotally support points or cylindrical extensions 11 of a nut member 10. Nut member 10 is provided with a threaded central aperture which is engaged by the threaded portion of screw 8 whereby, in the manner to be described below, rotation of the screw 8 will results in clamping pieces 1 and 3 being driven toward and away from one another.

Clamping pieces 1 and 3 are respectively provided with concave inwardly directed faces 12 and 13. A first fastening element 15 is welded at 14 to the face 13 of clamping member 3. A prolongation 16 of a first end of fastening element 15 bridges the gap between clamping pieces 1 and 3 and contacts the concave face 12 of clamping piece 1. The fastening element 15 is bent helically and is affixed, in the vicinity of its second end, to the face 12 of clamping piece 1 by a weld indicated at 17. A second prolongation of element 15, comprising bar 18, extends past weld 17 and bridges the gap between clamping pieces 1 and 3 so as to be in contact with face 13 of clamping piece 3.

A second fastening element 20, which like element 15 is formed into a helical shape, has its first end affixed by a weld 19 to face 13 of clamping piece 3. Weld 19 is located so as to position element 20 generally in helical alignment with the bar 18. Fastening element 20 is also affixed, by means of weld 21, to face 12 of clamping piece 1. A bar-extension 22 of fastening element 20 bridges the gap between clamping pieces 1 and 3 and contacts the concave face 13 of clamping piece 3 as shown.

FIG. 4 depicts the tightening collar of the embodiment of FIGS. 1-3 as used to couple a helicoidally reinforced tubular member 26 to a conduit 25 which, for purposes of explanation, has been shown as having a smooth outer wall. Tube 26 may, for example, be comprised of a plastic material having a wire helicoidal reinforcement fitting integral with the walls thereof. Tube 26, accordingly, is provided on the outside with helical turns in relief; i.e., tube 26 has a corrugated helical outer surface. As may be seen from FIG. 4, the tightening collar is placed on tube 26 in such a manner that the fastening elements 15 and 20 are positioned in the spaces between the helical convolutions in the tube wall. After installation of the collar screw 8 is turned to drive clamping pieces 1 and 3 toward one another. During this tightening operation the section of the turns formed by fastening elements 15 and 20 is reduced and the portions of tube 26 situated between the integral reinforcement wire are compressed against the outer wall of conduit 25. The compressed portions of tube 26 are thus gripped, and in turn grip conduit 25, over a length exceeding two full turns without any substantial break in continuity since, when the collar is tightened, the ends of rod 18 extends to a point in the vicinity of the first end of fastening element 20 at weld 19. Also, the rod extensions 16 and 22 of the fastening elements are firmly applied to the surface of tube 26 by the concave faces 12 and 13 of clamping pieces 1 and 3 whereby, even if a comparatively large space were left between the end of rod 18 and the end of element 20, there would be no leakage since such space would be intermediate portions of tubular member 26 which were clamped tightly against conduit 25.

FIG. 5 depicts a second embodiment of the invention which comprises a pair of clamping pieces 30 and 31 which respectively include cheeks 32 and 33. The slots 34 of cheeks 32 accommodate ends 35 of elongated piece 36. Piece 36, like piece 7 of the FIG. 1 embodiment, has a smooth hole which receives screw 37. The head of screw 37 interacts with the face of piece 36 while the threaded portion of the screw engages a nut supported, by points 40, in slots 41 of cheeks 33 of clamping piece 31.

The clamping piece 30 is provided with a concave surface 42 to which is affixed, by welds 43 and 44, bars 45 and 46. Bars 45 and 46 are provided, at first ends thereof, with respective rings 47 and 48. The opposite ends of each of bars 45 and 46 extends into contact with concave surface 49 of clamping piece 31. A second pair of bars 50 and 51 are welded to the concave face 49 of clamping piece 31. Bar 51 is extended so as to interact with concave surface 42 of clamping piece 32 and is provided, at its opposite end, with a ring 53. A bar 50 is welded to surface 49, at a point in the vicinity of that edge of clamping piece 31 which is opposite to the extension of bar 45, and is provided with a ring 54 on one end.

The rings 47 and 53 are connected by a cable 55 while the rings 48 and 54 are connected by a cable 56. The bars and connecting cables extend over a length exceeding two helical turns.

The tightening collar of the embodiment of FIG. 5 is employed in the same manner as that of the FIG. 1 embodiment and offers the advantage of increased flexibility. That is, the tightening collar of the FIG. 1 embodiment is restricted to use on a reinforced tube of a single diameter whereas the FIG. 5 embodiment may be used with different diameter tubes merely by changing the length of cables 55 and 56.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. Apparatus for clamping together tubular members, said apparatus in use circumscribing and engaging an outer surface of a tube wall, said clamping apparatus comprising:
   first elongated helically formed tube engaging means;
   second elongated helically formed tube engaging means;
   a first translatable support means;
   a second translatable support means, said second tube engaging means being affixed adjacent its first end to a first surface of said second support means, said second engaging means having an intermediate point affixed to the first surface of said first support means, the portion of said second engaging means between said intermediate point and the second end thereof extending to contact said first surface of said second support means at a point offset axially with respect to a circumscribed tubular member from the first end of said second engaging means, said first engaging means also being affixed to said second support means first surface at a first point intermediate the length of said first engaging means, the portion of said first engaging means between said first intermediate point and the first end thereof extending to contact said first surface of said first support means, a second intermediate point of said first engaging means being affixed to said first support means first surface, and the portion of said first engaging means between said second intermediate point and the second end thereof extending to contact said first surface of said second support means at a point generally helically aligned with the first end of said second engaging means; and
   means interconnecting said support means for causing movement thereof in a circumferential direction with respect to a circumscribed tube to expand and contract the diameter of the helix defined by said engaging means.

2. The apparatus of claim 1 wherein said first surfaces of said first and second support means have a concave shape.

3. The apparatus of claim 1 wherein said tube engaging means are each comprised of a helically formed elongated metal member, said members cooperating to define in excess of two complete turns of a helix.

4. The apparatus of claim 2 wherein said tube engaging means are each comprised of a helically formed elongated metal member, said members cooperating to define in excess of two complete turns of a helix.

5. The apparatus of claim 1 wherein each of said tube engaging means comprises:
   first bar means, said first bar means extending from a first end of the engaging means to a point at the opposite side of the point of affixation of the engaging means to one of said supporting means, the second end of said first bar means defining a loop;
   second bar means, said second bar means extending from the second end of the engaging means to a point at the opposite side of the point of affixation of the engaging means to the other of said supporting means, the second end of said second bar means defining a loop; and
   cable means interconnecting said loops.

6. The apparatus of claim 5 wherein said first surfaces of said first and second support means have a concave shape.

7. The apparatus of claim 1 wherein each of said tube engaging means defines more than one and less than one and one-half turns of a helix.

References Cited

UNITED STATES PATENTS

| 1,935,085 | 11/1933 | Euwer | 24—283 |
| 2,423,195 | 7/1947 | Longden | 24—279 |
| 3,141,220 | 7/1964 | Gewiss | 24—283 |

FOREIGN PATENTS

| 541,613 | 12/1941 | Great Britain | 24—283 |

BERNARD A. GELAK, Primary Examiner

K. J. DORNER, Assistant Examiner

U.S. Cl. X.R.

24—286